(12) United States Patent
Miyazaki et al.

(10) Patent No.: US 11,122,728 B2
(45) Date of Patent: Sep. 21, 2021

(54) TRACTOR

(71) Applicant: Yanmar Co., Ltd., Osaka (JP)

(72) Inventors: Takeshi Miyazaki, Osaka (JP); Toshiyuki Miwa, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 191 days.

(21) Appl. No.: 16/466,603

(22) PCT Filed: Nov. 30, 2017

(86) PCT No.: PCT/JP2017/043139
§ 371 (c)(1),
(2) Date: Jun. 4, 2019

(87) PCT Pub. No.: WO2018/105497
PCT Pub. Date: Jun. 14, 2018

(65) Prior Publication Data
US 2019/0320573 A1 Oct. 24, 2019

(30) Foreign Application Priority Data

Dec. 5, 2016 (JP) .............................. JP2016-236030

(51) Int. Cl.
*A01B 63/10* (2006.01)
*B60K 28/04* (2006.01)
*B62D 49/00* (2006.01)

(52) U.S. Cl.
CPC .............. *A01B 63/10* (2013.01); *B60K 28/04* (2013.01); *B62D 49/00* (2013.01)

(58) Field of Classification Search
CPC ........ A01B 63/10; A01B 63/00; B60K 28/04; B60K 28/10; B62D 49/00
See application file for complete search history.

(56) References Cited

U.S. PATENT DOCUMENTS 6,316,891 B1 * 11/2001 Hough .................. B60K 25/00
180/273
6,935,434 B1 * 8/2005 Easton .................. A01B 63/00
172/439

(Continued)

FOREIGN PATENT DOCUMENTS

JP S63-186208 U 11/1986
JP 1987-139208 U 9/1987

(Continued)

OTHER PUBLICATIONS

International Search Report dated Feb. 13, 2018 issued in corresponding PCT Application PCT/JP2017/043139.

*Primary Examiner* — Frank B Vanaman
(74) *Attorney, Agent, or Firm* — Norton Rose Fulbright US LLP

(57) ABSTRACT

A tractor in which a lift valve of a hydraulic system for lifting up/down a work machine is mechanically coupled to a lift lever, and conditions for an engine startup are set as follows: a reverser lever is at a neutral position thereof; a PTO (power take-off) clutch is disengaged; a seat switch is ON; and the lift lever is at a lowermost position thereof. A switch driving unit is provided on a side face of the lift lever so that the side face is orthogonal to a turning direction of the lift lever; a switch is provided so as to be opposed to the switch driving unit when the lift lever is turned to be at the lowermost position; and the lift lever at the lowermost position is detected by the switch.

4 Claims, 10 Drawing Sheets

(56) References Cited

U.S. PATENT DOCUMENTS

| | | | | |
|---|---|---|---|---|
| 2002/0023794 A1* | 2/2002 | Pierce | ................ | B60G 17/019 |
| | | | | 180/170 |
| 2011/0118961 A1* | 5/2011 | Koenen | ............... | F02N 11/0803 |
| | | | | 701/113 |
| 2012/0234620 A1* | 9/2012 | Boyarski | ................ | B60K 28/04 |
| | | | | 180/273 |
| 2014/0005858 A1* | 1/2014 | Miller, IV | ............. | B66F 9/0759 |
| | | | | 701/1 |
| 2015/0012187 A1* | 1/2015 | Kato | ...................... | B60K 28/04 |
| | | | | 701/50 |
| 2016/0029546 A1* | 2/2016 | Komatsu | ................ | A01B 71/02 |
| | | | | 701/50 |
| 2019/0210459 A1* | 7/2019 | Kojima | ................ | B60W 20/00 |

FOREIGN PATENT DOCUMENTS

| | | |
|---|---|---|
| JP | 6-032837 Y2 | 8/1994 |
| JP | 9-009719 A | 1/1997 |
| JP | 2000-106723 A | 4/2000 |
| JP | 2003-009608 A | 1/2003 |
| JP | 2004-190636 A | 7/2004 |
| JP | 2007-290617 A | 11/2007 |
| JP | 2007-325532 A | 12/2007 |
| JP | 2009-273426 A | 11/2009 |
| JP | 2010-051189 A | 3/2010 |
| JP | 2013-129304 A | 7/2013 |
| JP | 2016-113044 A | 6/2016 |
| JP | 2016-200038 A | 12/2016 |

\* cited by examiner

TRACTOR

CROSS REFERENCES TO RELATED APPLICATIONS

This application is a national stage application pursuant to 35 U.S.C. § 371 of International Application No. PCT/JP2017/043139, filed on Nov. 30, 2017 which claims priority under 35 U.S.C. § 119 to Japanese Patent Application No. 2016-236030 filed on Dec. 5, 2016, the disclosures of which are hereby incorporated by reference in their entireties.

TECHNICAL FIELD

The present invention relates to a tractor, and particularly to a technique of reliably preventing actuation of a work machine at engine startup.

BACKGROUND ART

Patent Literature 1 (PTL 1) discloses an arrangement of preventing actuation of a hydraulic system at engine startup by setting conditions to be satisfied to send electricity to a hydraulic control circuit as follows: a seat switch configured to detect that an operator is seated on a driver seat is "ON"; and a lowered position detection switch configured to detect that a lift lever has been operated to a lowered position is "ON".

CITATION LIST

Patent Literature

PTL 1: Japanese Utility Model Application Laid-Open No. S63(1988)-186208

SUMMARY OF INVENTION

Technical Problem

In the arrangement of PTL 1, after engine startup is allowed, the lift lever has to be operated to the lowered position once. Furthermore, in a case where a hydraulic circuit for lifting up/down a work machine is mechanically associated with the lift lever, the work machine is unintentionally moved up/down at engine startup if the lift lever is at a raised position at engine startup despite that the work machine is at a low position. As such, there has been room for improvement.

An object of the present invention is to provide a technique of reliably preventing actuation of a work machine at engine startup by allowing engine startup only when predetermined conditions for engine startup are satisfied.

Solution to Problem

In a first aspect of the present invention, a tractor in which a lift valve of a hydraulic system for lifting up/down a work machine is mechanically coupled to a lift lever is arranged. In the tractor, conditions for engine startup are set as follows: a reverser lever is at a neutral position; a PTO clutch is disengaged; a seat switch is ON; and the lift lever is at a lowermost position.

In a second aspect of the present invention, the tractor is arranged such that the lift lever at the lowermost position is contactlessly detected.

In a third aspect of the present invention, the tractor is arranged such that: a switch driving unit is provided on a side face of the lift lever, the side face being orthogonal to a turning direction of the lift lever; a switch is provided so as to be opposed to the switch driving unit when the lift lever is turned to be at the lowermost position; and the lift lever at the lowermost position is detected by the switch.

In a fourth aspect of the present invention, the tractor is arranged such that an indicator plate indicating an "engine startable position" is provided at a position corresponding to the lowermost position of the lift lever.

Advantageous Effects of Invention

According to an embodiment of the present invention, actuation of the work machine at engine startup can be reliably prevented.

DESCRIPTION OF EMBODIMENTS

Figure 1:
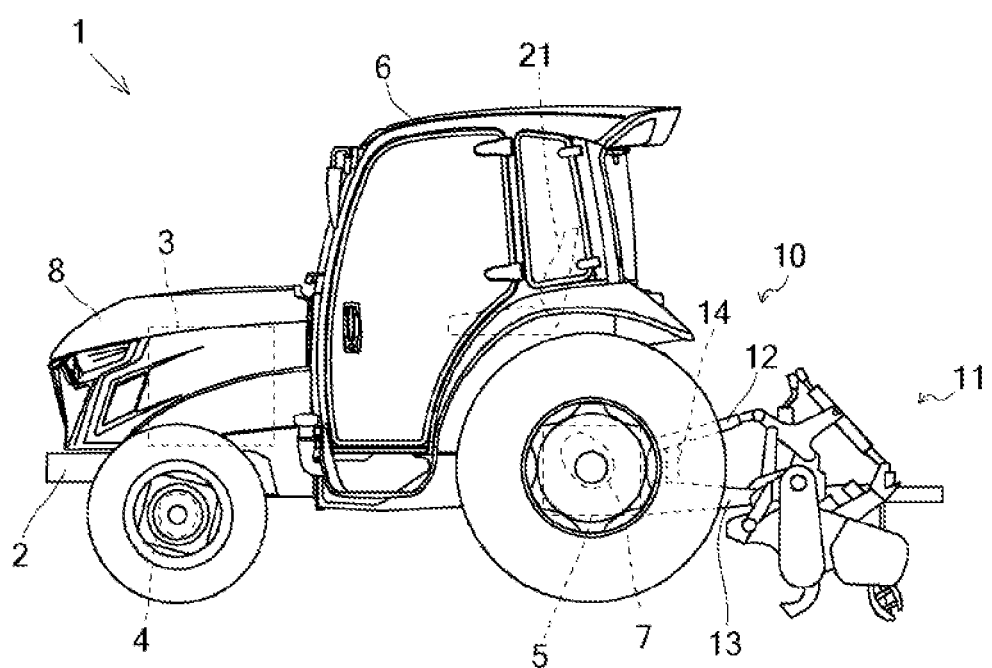
FIG. 1 A side view of a tractor.

FIG. 1 shows a schematic structure of a tractor 1. An engine 3, a front axle case 4, a transmission case 5, a cabin 6, a rear axle case 7, and the like are supported by a frame 2. The engine 3 is installed inside a hood 8 provided forward of the cabin 6. Power of the engine 3 is transmitted to the front axle case 4 and to the rear axle case 7 via a transmission in the transmission case 5, to drive wheels.

Figure 2:
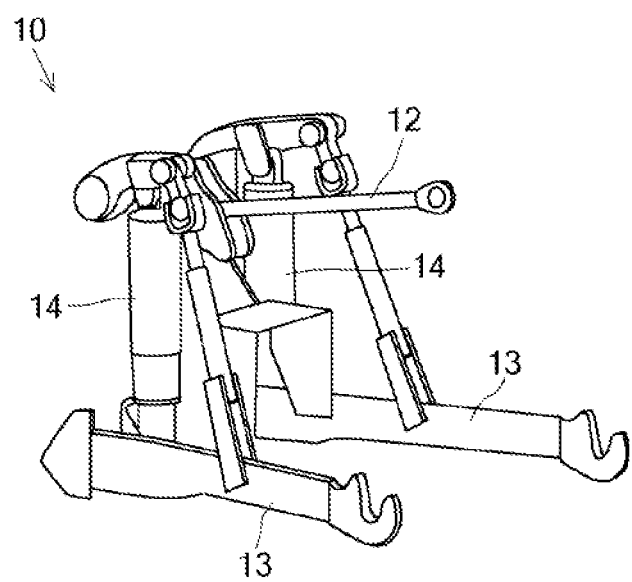
FIG. 2 A diagram illustrating a lift link for a work machine.

A work machine 11 is attached to a rear portion of the tractor 1 via a work machine attaching device 10. Power of the engine 3 is transmitted to a power take-off (PTO) drive shaft via a PTO transmission in the transmission case 5 and via a PTO clutch, to drive the work machine 11 coupled to the PTO drive shaft. The work machine attaching device 10 includes: a lift link including a top link 12 and lower links 13; and lift cylinders 14. The lift link is configured to be driven by actuating the lift cylinders 14, and this enables the work machine 11 to be lifted up/down (see FIG. 2).

Figure 3:
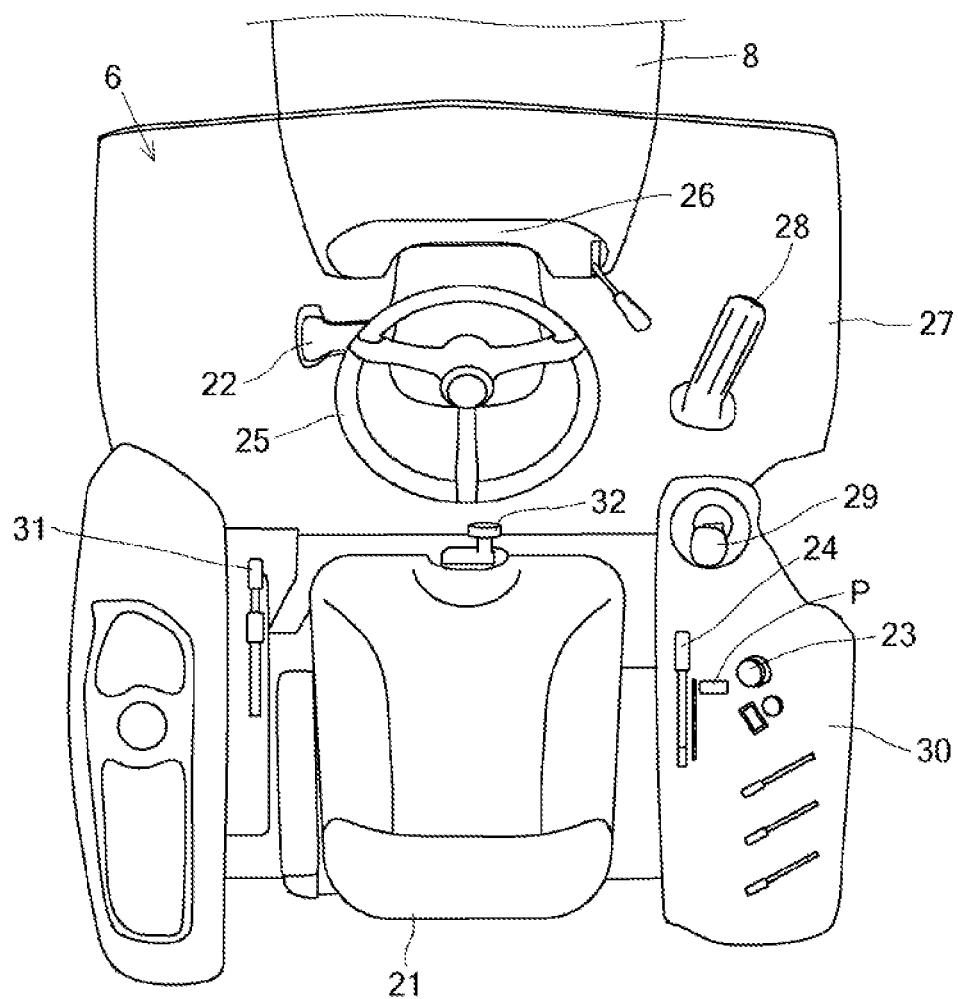
FIG. 3 A diagram illustrating an inside of a cabin.

As shown in FIG. 3, a driver seat 21 and operation tools are provided in the cabin 6. The operation tools include: a reverser lever 22 used to change a traveling direction (forward/reverse); a PTO switch 23 used to operate the PTO clutch configured to engage/disengage power transmission to the PTO drive shaft; a lift lever 24 used to lift up/down the work machine 11; and the like. The reverser lever 22 is the operation tool with three positions: forward; neutral; and reverse positions. The traveling direction of the tractor 1 is changed by changing the position of the reverser lever 22. The PTO switch 23 is the operation tool with "ON" and "OFF" positions. Whether to drive the work machine 11 is selected by changing the position of the switch 23. The lift lever 24 is the operation tool used to change the level of the work machine 11 by extending/retracting the lift cylinders 14 of the work machine attaching device 10.

In addition to the above-described operation tools, following elements are also provided in the cabin 6: a steering wheel 25 for steering operation of the tractor 1; a front meter panel 26 configured to display a traveling status of the tractor 1 and the like; a shift pedal 28 provided on a step 27; a lever guide panel 30 disposed to the right of the driver seat 21, through which panel 30 the PTO switch 23, the lift lever 24, a front loader operation lever 29, and the like are provided; a sub shift lever 31 provided to the left of the driver seat 21; and a hydraulic pressure adjustment knob 32 provided below the driver seat 21.

Figure 4:
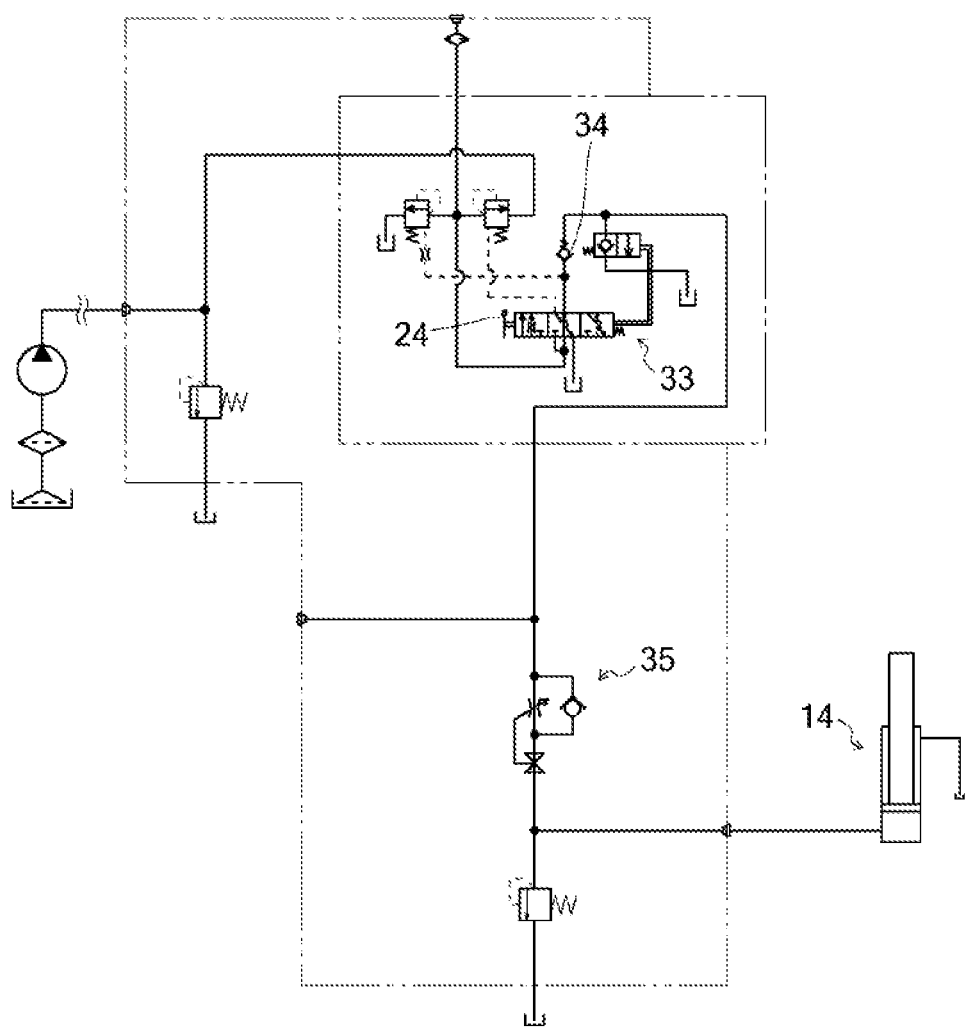
FIG. 4 A hydraulic circuit diagram of a hydraulic system for lifting up/down the work machine.

FIG. 4 is a diagram illustrating a hydraulic system for lifting up/down the work machine 11 and shows a hydraulic circuit around the lift cylinders 14. Operating action to the lift lever 24 is transmitted to a rod of a lift valve 33 via an appropriate link mechanism, and this changes the position of the lift valve 33. That is, the lift valve 33 is structured as a mechanical switching valve. Working fluid having passed through the lift valve 33 is sent to the lift cylinders 14 through a check valve 34 and a slow return valve 35. Thus, the tractor 1 adopts a so-called "hydraulic mechanical automatic system" to lift up/down the work machine 11, in which an operating action to the lift lever 24 mechanically drives the lift valve 33 to extend/retract the lift cylinders 14. The operation speed of the lift cylinders 14 is adjustable by turning the hydraulic pressure adjustment knob 32 to operate the slow return valve 35. Application of hydraulic pressure can be stopped by completely closing the slow return valve 35.

Figure 5:
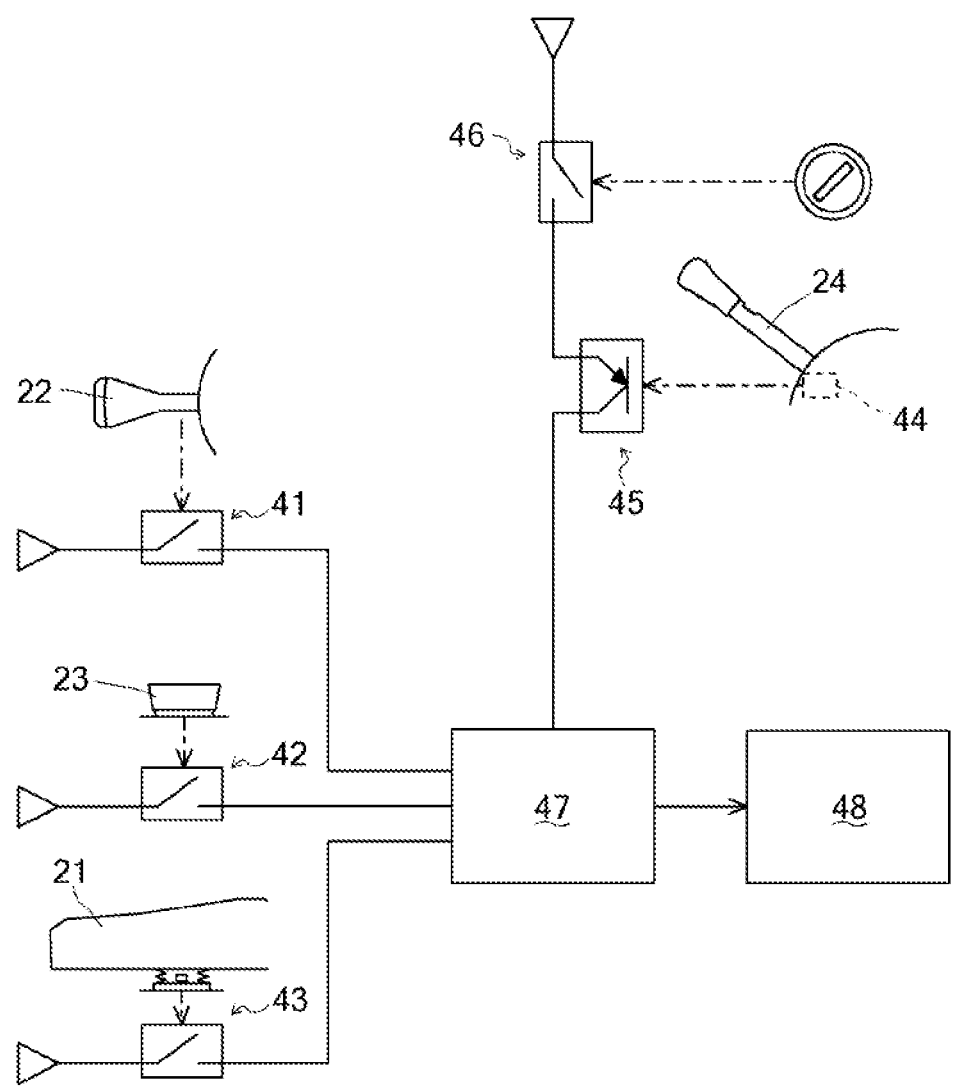
FIG. 5 A diagram illustrating a control structure related to engine startup.

The following will describe a control structure related to the engine startup of the tractor 1, with reference to FIG. 5.

The reverser lever 22 is provided with a switch 41 configured to detect that the position of the lever 22 is the neutral position. The switch 41 is designed to be "ON" when the reverser lever 22 is at the neutral position and to be "OFF" in other situations.

The PTO switch 23 is provided with a switch 42 configured to detect that the PTO switch 23 is "OFF". The switch 42 is designed to be "ON" when the PTO switch 23 is "OFF", and to be "OFF" when the PTO switch 23 is "ON". That is, the switch 42 is configured to detect that the PTO clutch is disengaged.

The driver seat 21 is provided with a seat switch 43 configured to detect that an operator is seated. The seat switch 43 is configured to determine whether the operator is seated or not by detecting a load on the driver seat 21. The seat switch 43 is designed to be "ON" when the load on the driver seat 21 is equal to or more than a predetermined value, and to be "OFF" when the load is less than the predetermined value.

The lift lever 24 is provided with a sensor unit 44 configured to contactlessly detect that the position of the lever 24 is a lowermost position. The sensor unit 44 is configured to detect that the lift lever 24 is at the lowermost position, i.e., the lift lever 24 has been operated to a lowermost end portion. The sensor unit 44 includes a switch 45 designed to be "ON" when the lift lever 24 is at the lowermost position and to be "OFF" when the lever 24 is at other positions.

Furthermore, a key switch 46 is provided. The key switch 46 is connected in series with the switch 45 of the sensor unit 44 configured to detect the position of the lift lever 24. The key switch 46 is disposed on a battery side relative to the switch 45. The key switch 46 is designed to be turned "ON" when an ignition key is turned to an engine startup position, and to be turned "OFF" when the ignition key is turned to a stop position.

These switches 41, 42, 43, 45, and 46 are connected to the battery and to a relay unit 47. The relay unit 47 is connected to an engine control unit (ECU) 48, which is a control device for the engine 3. The relay unit 47 is configured to transmit a control signal for engine startup to the ECU 48 after all the switches 41, 42, 43, 45, and 46 are turned "ON".

As described above, in this embodiment, the following conditions have to be satisfied to start the engine 3 by turning the ignition key: (1) the reverser lever 22 is at the neutral position, to prevent the tractor 1 from traveling in the forward or reverse direction; (2) the PTO switch 23 is "OFF", that is, the PTO clutch is disengaged to prevent actuation of the work machine 11; (3) an operator is seated on the driver seat 21; and (4) the lift lever 24 is at the lowermost position, to prevent upward movement of the work machine 11 at startup of the engine 3.

The above configuration enables restrictions on: a traveling system of the tractor 1; a driving system of the work machine 11; and a lifting system of the work machine 11, to reliably prevent actuation of these systems at startup of the engine 3. In other words, the above configuration enables restriction such that no hydraulic system is actuated in the tractor 1 at startup of the engine 3.

The conditions for the startup of the engine 3 include the seated state on the driver seat 21. Due to this, the startup of the engine 3 is not allowed in the absence of an operator on the driver seat 21.

Figure 6:
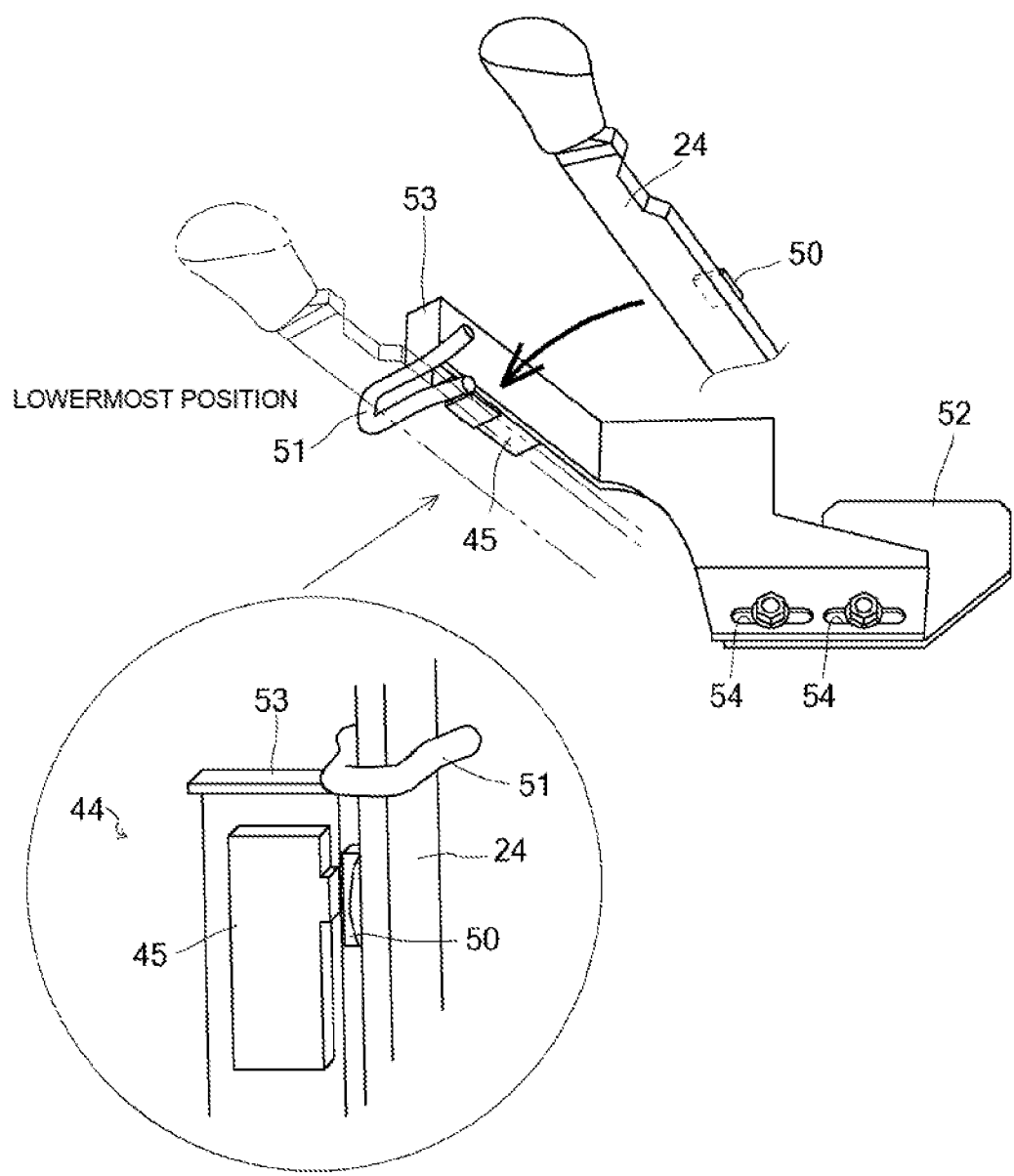
FIG. 6 A diagram illustrating a structure of a sensor unit of a lift lever.

Now, a specific structure of the sensor unit 44 configured to contactlessly detect the lowermost position of the lift lever 24 will be described with reference to FIG. 6.

The sensor unit 44 includes: a magnet 50 provided on a lever side face, which is a side face orthogonal to a turning direction of the lift lever 24; and a switch 45 configured to be actuated by the magnet 50 coming close to the switch 45. The switch 45 is provided at a position such that the switch 45 is opposed to the magnet 50 provided on the side face of the lift lever 24 when the lift lever 24 is in contact with a lever receiver 51, i.e., when the lift lever 24 is turned to be at the lowermost position.

The switch 45 is turned "ON" when the lift lever 24 is lowered to the lowermost position to bring the magnet 50 on the lever side face close to the switch 45. The switch 45 is disposed on a stay 53 fixed to a frame 52. Thus, the magnet 50 is configured to come close to/move away from the switch 45 fixed to the stay 53 as the lift lever 24 is turned. The magnet 50 also functions as a switch driving unit configured to turn on the switch 45 when coming close to the switch 45.

The stay 53 has elongated holes 54 at a portion fixed to the frame 52. Each of the holes 54 is long in the turning direction of the lift lever 24. The stay 53 is attached to the frame 52 using these elongated holes 54. This enables accurate positioning of the switch 45 and the lift lever 24 (the magnet 50).

The switch 45 reacts and is turned "ON" when the magnet 50 attached to the lift lever 24 is opposed to the switch 45.

That is, the sensor unit 44 adopts contactless detection, instead of known contact detection. This enables the lift lever 24 to be reliably maintained at the lowermost position without receiving a reaction force from the switch, when the lift lever 24 is operated to the lowermost position. Furthermore, it is possible to reliably detect that the lift lever 24 is at the lowermost position by the simple structure of: the magnet 50 attached to the lever side face of the lift lever 24 which is turning; and the switch 45 configured to react the magnet 50.

Figure 7:
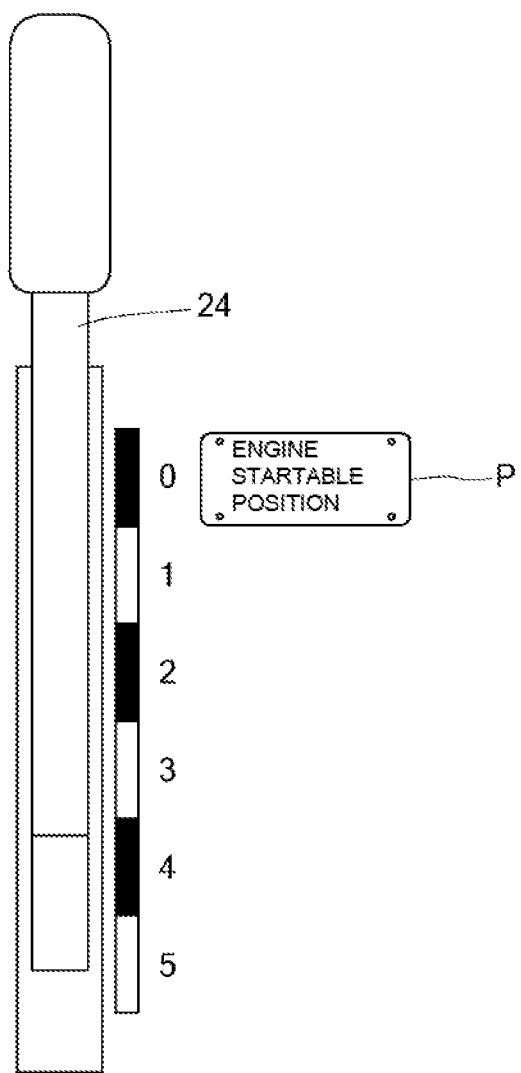
FIG. 7 A diagram illustrating an indicator plate of the lift lever, and an enlarged view of a part of FIG. 3.

Still further, as shown in FIG. 7, an indicator plate P indicating an "engine startable position" may be attached to a position corresponding to the lowermost position of the lift lever 24. This functions as an index to start the engine 3 and makes it easier to properly position the lift lever 24. For example, assume that a lever guide for the lift lever 24 is provided with indicator labels "0", "1", "2", "3", and so on in a stepwise ascending manner, where "0" indicates the lowest position of the lever 24. In this case, the indicator plate P is provided beside the label of "0" indicating the lowermost position, for example.

Figure 8:
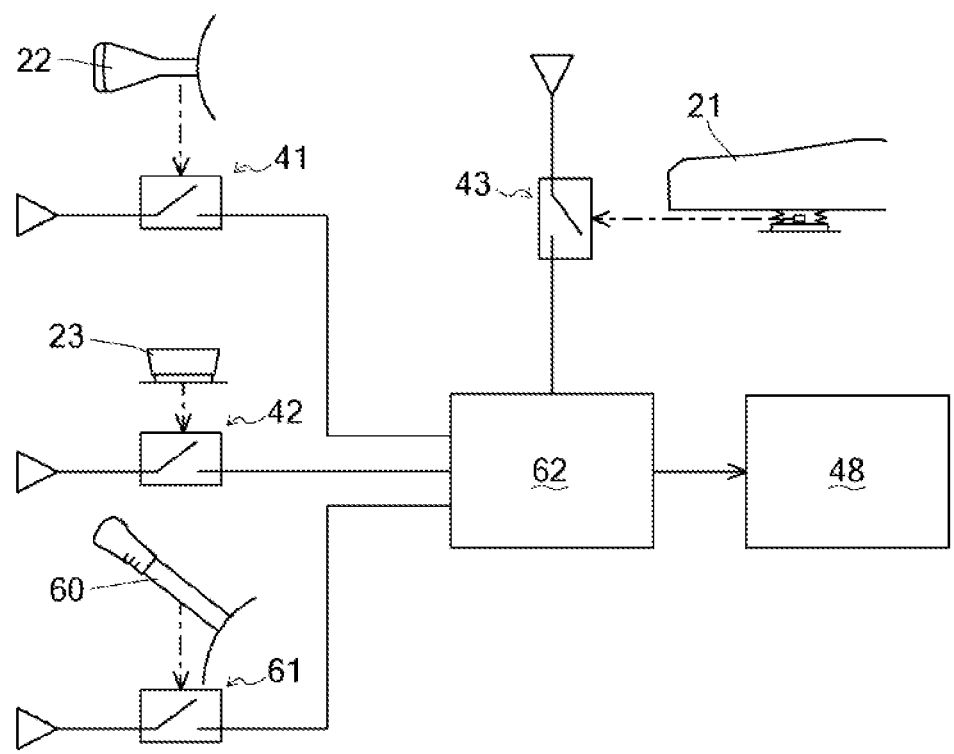
FIG. 8 A diagram illustrating a control structure related to PTO external operation.

Now, a description will be given for a control structure related to PTO external operation, with reference to FIG. 8.

In addition to the above-described operation tools, a parking lever 60 is provided in the cabin 6. The parking lever 60 is used to operate a parking brake configured to brake the vehicle body of the tractor 1. The parking lever 60 is provided with a switch 61 configured to detect that the position of the lever 60 is "ON". The switch 61 is designed to be "ON" when the parking lever 60 is at the "ON" position and to be "OFF" in other situations.

A relay unit 62 is connected to: the switch 41 configured to detect that the reverser lever 22 is at the neutral position; the switch 42 configured to detect that the PTO switch 23 is "OFF"; the seat switch 43 configured to detect that an operator is seated on the driver seat 21; the switch 61 configured to detect that the parking lever 60 is "ON"; and the battery. The battery is connected via the switches 41, 42, 43, and 61.

Basically, the relay unit 62 is configured to output a control signal for stopping the engine to the ECU 48, depending on the "ON"/"OFF" states of the switches 41, 42, 43, and 61. More specifically, the relay unit 62 is configured to transmit the control signal to the ECU 48 to stop the engine 3 when the seat switch 43 is turned "OFF" under the situation that the PTO switch 23 is "ON" (the switch 42 is "OFF").

However, when the seat switch 43 is turned "OFF", that is, when an operator leaves the driver seat 21 under the situation that: (1) the reverser lever 22 is at the neutral position (the switch 41 is "ON"); (2) the PTO switch 23 is "OFF" (the switch 42 is "ON"); and (3) the parking lever 60 is pulled (the switch 61 is "ON"), the relay unit 62 is configured to transmit a control signal to the ECU 48 to keep the engine 3 running.

As described above, the ECU 48 is controlled so that the engine 3 is not stopped but is kept running when an operator intentionally leaves the driver seat 21 under the predetermined conditions. It is possible for an operator to leave the driver seat 21 and perform external operation to the work machine 11 by allowing the operator to turn "ON" the PTO switch 23 (to engage the PTO clutch) under the above circumstances.

Figure 9:
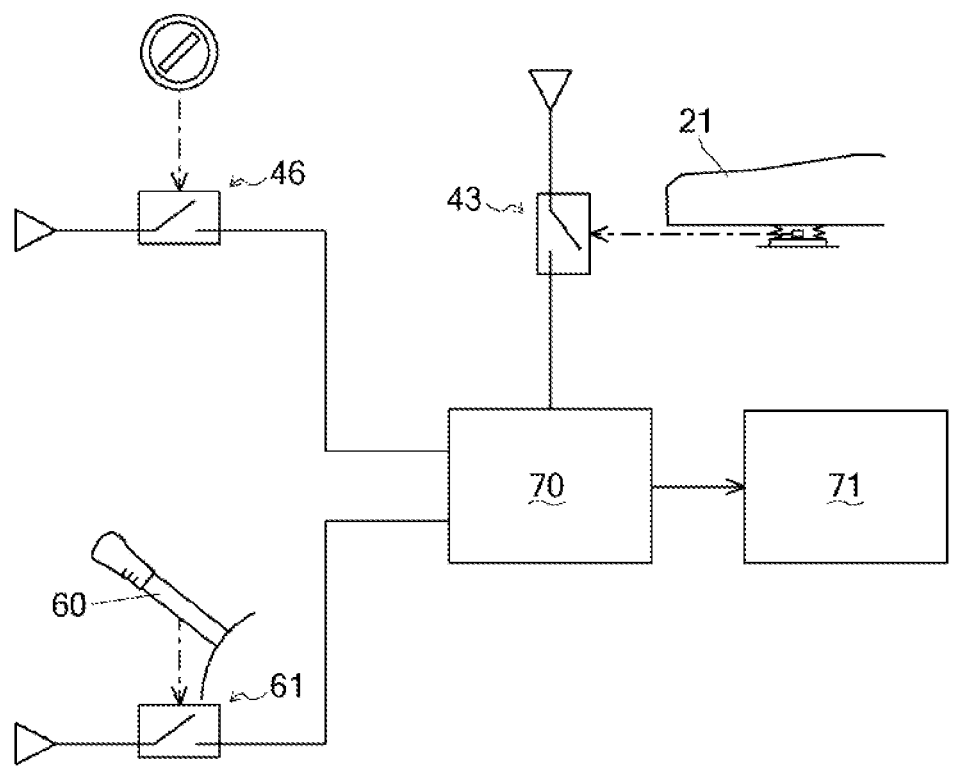
FIG. 9 A diagram illustrating a control structure to give a warning when an operator leaves a driver seat with a parking brake off.
Figure 10:
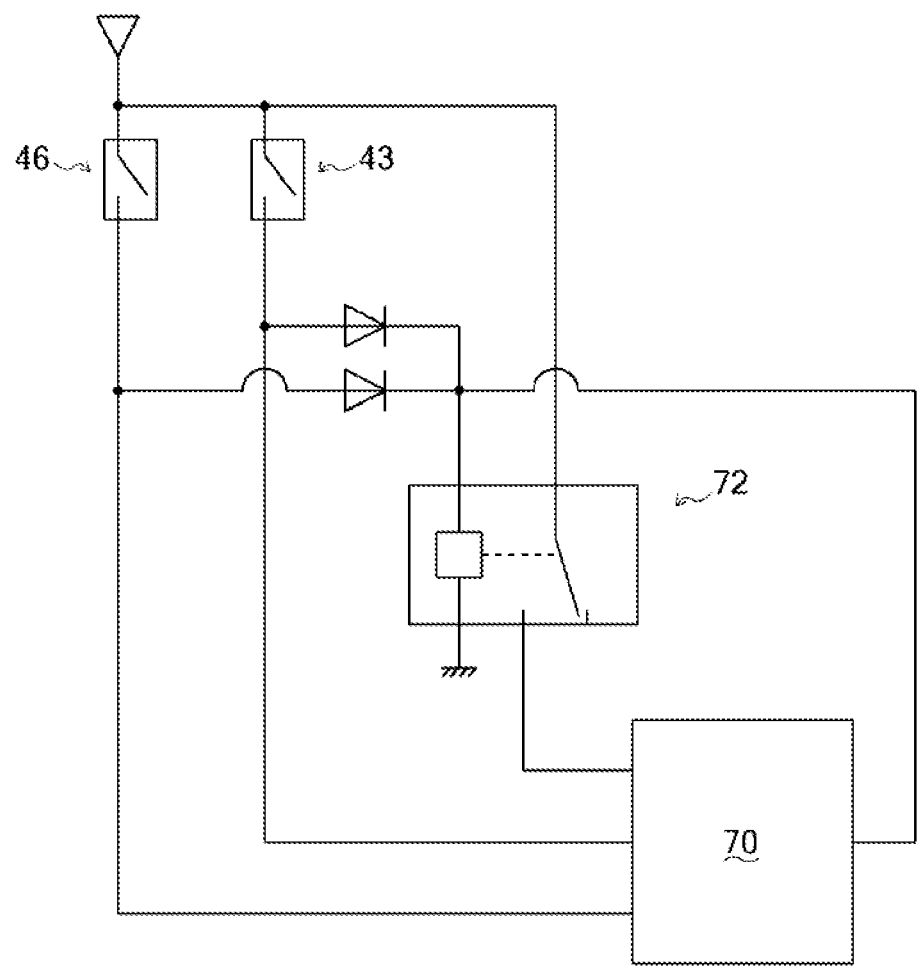
FIG. 10 A diagram illustrating an example of a control structure to enable power supply to a warning unit even when a key switch is off.

The following will describe a control structure for a case where an operator leaves the driver seat 21 with the parking brake "OFF", with reference to FIG. 9 and FIG. 10.

A control unit 70 is connected to the seat switch 43 configured to detect that an operator is seated on the driver seat 21; the key switch 46 configured to detect the position of the ignition key; the switch 61 configured to detect that the parking lever 60 is "ON"; and the battery. The battery is connected via the switches 43, 45, and 61.

The control unit 70 is configured to output a control signal for warning to a warning unit 71, depending on the "ON"/"OFF" states of the switches 43, 45, and 61. More specifically, the control unit 70 is configured to transmit the control signal to the warning unit 71 to provide notification that braking operation using the parking brake is not performed when: (1) the parking lever 60 is not pulled (the switch 61 is "OFF"); and (2) the operator leaves the driver seat 21 (the seat switch 43 is turned "OFF"), irrespective of the state of the key switch 46. The warning unit 71 is configured to provide visual notification using a lamp and audio notification using a beeper, for example.

Thus, regardless of the operating action to the ignition key, the warning unit 71 provides notification when an operator leaves the driver seat 21 with the parking brake off.

FIG. 10 shows an example of a configuration which enables power supply from the battery even when the ignition key is "OFF". As shown in FIG. 10, a timer 72 is provided. The timer 72 is connected to the battery in parallel with the key switch 46 and with the seat switch 43. When the key switch 46 is turned "ON", voltage rises in the control unit 70, and power is supplied to the timer 72 to activate the timer 72. When the seat switch 43 is turned "ON", voltage rises in the control unit 70, and power is supplied to the timer 72 to activate the timer 72.

An input side of the timer 72 is directly connected to the battery. This makes it possible to supply power from the battery to the control unit 70 connected to an output side of the timer 72 while the timer 72 is active. That is, while the timer 72 is active because the key switch 46 and/or the seat switch 43 is "ON", it is possible to supply power from the battery to the control unit 70 via the timer 72.

Thus, it is possible to supply power from the battery to the control unit 70 via the timer 72 when either one of the key switch 46 and the seat switch 43 is "ON".

Meanwhile, upon the power supply to the control unit 70 via the timer 72, the control unit 70 outputs a self holding relay where the control unit 70 and the timer 72 constitute a closed circuit. That is, when either one of the key switch 46 and the seat switch 43 is turned "ON" to activate the timer 72 and thereby power is supplied from the battery to the control unit 70, the self holding relay is provided and kept active for a predetermined period of time, thereby to keep the timer 72 active. This function of the self holding circuit makes it possible to supply power to the control unit 70 for a predetermined period of time after both of the key switch 46 and the seat switch 43 are turned "OFF", and therefore enables power supply to the warning unit 71.

Thus, even when an operator turns the ignition key to the OFF position and gets out the tractor 1 with the parking brake off, it is possible to supply power from the control unit 70 to the warning unit 71 for the predetermined period of time. This allows reliable actuation of the warning unit 71.

Furthermore, after an operator finishes the usage of the tractor 1 and gets out the tractor 1, the self holding relay is removed after a predetermined period of time passes. This stops the operation of the timer 72 and thereby stops the power supply to the control unit 70. As a result, power is not consumed any more, and therefore the battery does not run out.

Although the embodiment shown in FIG. 10 has the configuration in which the self holding circuit of the control unit 70 includes the timer 72, the present disclosure is not limited to this, and alternative configurations are also possible. For example, the control unit 70 may be configured to output power for self power supply by providing such a self holding circuit inside the control unit 70, and to stop the output after a predetermined period of time.

REFERENCE SIGNS LIST 1 tractor
3 engine
14 lift cylinder
21 driver seat
22 reverser lever
23 PTO switch
24 lift lever
25 lift valve
41 switch
42 switch
43 seat switch
44 sensor unit
45 switch
47 relay unit
48 ECU
P indicator plate

The invention claimed is:

1. A tractor in which a lift valve of a hydraulic system for lifting up/down a work machine is mechanically coupled to a lift lever,
wherein conditions for an engine startup are set as follows:
a reverser lever is at a neutral position thereof;
a power take-off clutch is disengaged;
a seat switch is ON; and
the lift lever is at a lowermost position thereof,
wherein the tractor includes:
a switch configured to contactlessly detect that the lift lever is at the lowermost position;
a switch driving unit provided on a side face of the lift lever, the side face being orthogonal to a turning direction of the lift lever; and
a lever receiver configured to guide both side faces of the lift lever at the lowermost position, the both side faces being orthogonal to the turning direction of the lift lever,
wherein the switch is provided so as to be opposed to the switch driving unit when the lift lever is turned to be at the lowermost position and is guided by the lever receiver, and
wherein the lift lever at the lowermost position is detected by the switch.

2. The tractor according to claim 1, wherein the lever receiver has a shape such that an inner width of the lever receiver in a direction orthogonal to the turning direction of the lift lever decreases from a position higher than the lowermost position in the turning direction toward the lowermost position.

3. The tractor according to claim 2, wherein an indicator plate indicating an engine startable position is provided at a position corresponding to the lowermost position of the lift lever.

4. The tractor according to claim 1, wherein an indicator plate indicating an engine startable position is provided at a position corresponding to the lowermost position of the lift lever.

* * * * *